United States Patent
Uba et al.

(10) Patent No.: US 9,401,989 B2
(45) Date of Patent: Jul. 26, 2016

(54) WORK ASSIGNMENT WITH BOT AGENTS

(71) Applicant: Avaya Inc., Basking Ridge, NJ (US)

(72) Inventors: Gene Masaru Uba, Broomfield, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/019,393

(22) Filed: Sep. 5, 2013

(65) Prior Publication Data

US 2015/0063556 A1 Mar. 5, 2015

(51) Int. Cl.
*H04M 3/51* (2006.01)
*H04M 3/523* (2006.01)

(52) U.S. Cl.
CPC .......... *H04M 3/5175* (2013.01); *H04M 3/5232* (2013.01); *H04M 2203/401* (2013.01); *H04M 2203/402* (2013.01)

(58) Field of Classification Search
CPC ................. H04M 2203/401; H04M 2203/402
See application file for complete search history.

(56) References Cited

U.S. PATENT DOCUMENTS

| | | | |
|---|---|---|---|
| 6,988,126 B2 | 1/2006 | Wilcock et al. | |
| 8,515,049 B2 * | 8/2013 | Chavez et al. | 379/265.02 |
| 8,699,695 B2 | 4/2014 | Flockhart et al. | |
| 8,767,948 B1 * | 7/2014 | Riahi | G06N 99/005 |
| | | | 379/265.02 |
| 8,953,773 B2 | 2/2015 | Steiner | |
| 8,953,775 B2 | 2/2015 | Flockhart et al. | |
| 2004/0101127 A1 * | 5/2004 | Dezonno et al. | 379/265.02 |
| 2010/0235218 A1 | 9/2010 | Erhart et al. | |
| 2010/0296417 A1 * | 11/2010 | Steiner | 370/260 |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2012/0215577 A1 | 8/2012 | D'Arcy et al. | |
| 2014/0081687 A1 | 3/2014 | Flockhart et al. | |
| 2014/0081689 A1 | 3/2014 | Steiner et al. | |
| 2014/0082179 A1 | 3/2014 | Steiner et al. | |
| 2014/0223436 A1 | 8/2014 | Steiner | |
| 2014/0257908 A1 | 9/2014 | Steiner et al. | |
| 2014/0270138 A1 | 9/2014 | Uba et al. | |
| 2014/0365440 A1 | 12/2014 | Steiner | |

\* cited by examiner

*Primary Examiner* — Harry S Hong
(74) *Attorney, Agent, or Firm* — Sheridan Ross P.C.

(57) ABSTRACT

A contact center auditing work assignment engine communication system hosts a multi-functional automatic bot agent to discover issues, update properties, identify and solve problems, and provide operational support for contact center managers, creating a proactive and flexible automatic audit and cooperation between a bot agent, human agents, and supervisors.

15 Claims, 4 Drawing Sheets

WORK ASSIGNMENT WITH BOT AGENTS

FIELD OF THE DISCLOSURE

The present disclosure is generally directed toward communications and more specifically toward contact centers.

BACKGROUND

Contact centers can provide numerous services to customers. The customers expect all contact center services to be provided efficiently and correctly. If there are issues on calls and/or with particular agents, the issues may create a serious liability for the contact center. A contact center manager is responsible for addressing and correcting the issues before the issues become expensive and/or create customer dissatisfaction. Once the contact center manager identifies a problem with a particular call and/or agent, action needs to be taken to rectify the problem as soon as possible. Examples of issues on calls might include calls that have been waiting too long, leaving calls on hold too long, the agent getting angry, etc.

Common methods for the contact center manager to monitor the agent include the use of a reporting system that utilizes threshold checks, system-wide audits, speech analytics, and watchdog timers to take snapshots of the system, capture issues, and generate reports and alerts. The reports and the alerts currently rely on the contact center manager's proactive, diligent monitoring and availability to take corrective action. Though reports, alerts, and other types of audits are common and useful tools, most contact centers just live with the limitations created by manual follow-up.

SUMMARY

These and other needs are addressed by the various aspects, embodiments, and/or configurations of the present disclosure. The present disclosure is directed to a bot agent solution that can detect problem calls for a contact center manager, thereby enabling a new level of efficiency for issue resolution. A bot agent module is proposed herein that is capable of deploying bot agents as readying agents with flexible strategy and matching features.

When contact centers were first created, the contact centers were typically small operations that were in one location, servicing one company. Contact centers at the time were relatively easy to manage, where managers could reasonably keep an eye on agents and agent performance. The manager could walk around, check on or listen in on calls, and chat with agents about issues and challenges. As contact centers have grown in complexity, the number of tasks that must be handled have increased exponentially, creating significantly greater management challenges.

Today's contact centers are often distributed, with multiple locations and networks, typically configured to use a Call Management System (CMS) and an Automatic Call Distributor (ACD) to manage routing, goals, statistics, etc. This distributed architecture can often reduce or eliminate the manager's ability to walk around and check on agents and problems and the large number of work items makes it virtually impossible for managers to watch every single transaction.

To address the growing management challenges of complexity and distribution and to automate certain functions, bot agents may be employed in accordance with embodiments of the present disclosure. Bot agents, in one embodiment, are real call and/or readying agents put into service by the contact center manager. Bot agents can be injected into the contact center to be matched to a problem agent and/or selected calls. Scheduled bots have the ability to go ready like actual calls and/or agents and reschedule themselves to go ready again once they have completed a task. In some embodiments, bot agents can adjust scheduling time depending upon the series of matches that are made or not made between the bot agent and a call and/or agent.

In some embodiments, bot agents are provided with customized matching strategies. Customized matching strategies can allow for variable rescheduling and can specifically allow the bot agent to seek out certain types of agents and/or calls (inactive, problemed, stuck, etc). When the scheduled bot agents are matched to agents and/or calls, the scheduled bot agents may mark the agents and/or calls with a high priority so that the manager can get involved. Properties on the marked agent and/or marked call can be updated and can optionally trigger the marked agent or call to initiate or schedule his or her own matching event. The scheduled bot agent may also change properties on the call and/or the agent and trigger a match scan. Additionally, the scheduled bot agents can initiate new events (e.g., additional work items, calendar items for a manager, tasks for an agent, training for an agent, training for a manager, etc.) to help resurrect problems as programmed by the scheduled bot agent's strategy. The scheduled bot agent, in some embodiments, can change its own matching strategy so that a series of auditing strategies can be executed by a single scheduled bot agent.

When the manager makes a bot agent call or becomes a readying agent, he or she can indicate the type of matching strategy that he or she wants for that call and/or agent. For example, a manager could make a call with the strategy to match for inactive agents greater than 5 minutes, or the manager could be a readying agent and use a matching strategy for work that has been queued for one hour or longer. When the manager uses the bot agent to match to an agent and/or a call, he or she can talk with the caller and/or the agent that has been selected according to the matching strategy defined by the manager.

In some embodiments, a bot agent may or may not be connected to or associated with a real person. Another feature with scheduled or real-time bot agents is that they can go automatically ready again (after the matched call or agent hangs up) and attempt to match again on another call and/or agent without requiring additional input from a manager or system administrator. If there are no matches, then the bot agents can reschedule to re-ready again and rescan for a match at a later time. Bots agents can adjust their reschedule time, change their own strategies, and update the matching call or agent without connecting voice paths. Thus, in some embodiments, there would be no need for administration changes to manage wayward calls and/or agents when the bot agents are actively monitoring and automatically adjusting and marking within the system.

In a non-limiting example, a bot agent would assist with Service Observing (SO) for active calls affecting a threshold condition. The manager can use a bot agent that scans work that has already matched to agents with a defined criteria or criterion of handling duration exceeding norms. The bot agent may be represented in the contact center and administered like a normal agent, but may possess a special matching strategy. In some embodiments, the manager can log in as the bot agent and match (and/or conference) into the active call that has a long handling duration, allowing the manager to see if the agent requires additional assistance and/or support to complete the call. Once the manager completes participation or determines that the agent doesn't need help, the manger may release himself or herself from the call and re-ready himself or herself to scan for the next longest duration call to provide support and/or assistance.

Another aspect of the present disclosure is to enable a bot agent to be administered such that the bot agent auto-readies itself without being associated with a specific terminal or agent work station. This particular type of bot agent may be referred to as a phantom bot agent and the phantom bot agent may be configured to exist in the work assignment engine, continuously scanning for work items. When matching, the bot agent can conference in other agents and/or supervisors. To remove this bot agent, the administrator would administer the removal/disable of the bot agent, or another bot agent call could be initiated to match to this bot agent thereby removing the phantom bot agent.

These and other advantages will be apparent from the disclosure. In some embodiments a method is provided which generally comprises:

configuring a bot agent with a matching criteria that enables the bot agent to be matched with at least one of an agent and work item within a contact center;

scanning, with a work assignment engine, at least one of a work pool and agent pool of a contact center to determine attributes for at least one of work items and agent within the contact center;

selecting, with the work assignment engine, at least one of a work item and agent that comprises a set of attributes satisfying the matching criteria; and assigning the bot agent to the selected at least one of a work item and agent such that the bot agent is enabled to interact with the selected at least one of a work item and agent.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The phrase "go ready" as used herein refers to an agent's action of logging in and being available to take calls. A ready state refers to an agent's telephone, computer, and/or other communication devices in a workstation that are in service and may be matched to work items.

The term "terminal" as used herein refers to a device for communicating over a line. Examples of terminals include, but are not limited to, telephones, fax machines, computer terminals, network devices, printers, workstations, mobile telephones, laptops, tablets, and other business and customer devices.

The phrase "Call Management System (CMS)" as used herein refers to an Avaya application that includes database, administration, and reporting features to help businesses identify and take action on operational issues.

The phrase "Automatic Call Distributor (ACD)" as used herein refers to a system or device that routes incoming calls to agents.

The phrase "Service Observing (SO)" as used herein refers to a common method for a supervisor to monitor an agent by call monitoring, recording, and flagging for later review. A typical SO feature allows the supervisor to listen in and possibly participate on calls routed to the agent or group of agents, to a particular agent station, or calls that come into a particular directory number. The service observer can listen in for a portion of a call or for an entire call.

The term "user," "customer," or "client" denotes a party patronizing, serviced by, or otherwise doing business with a contact center or other type of enterprise.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
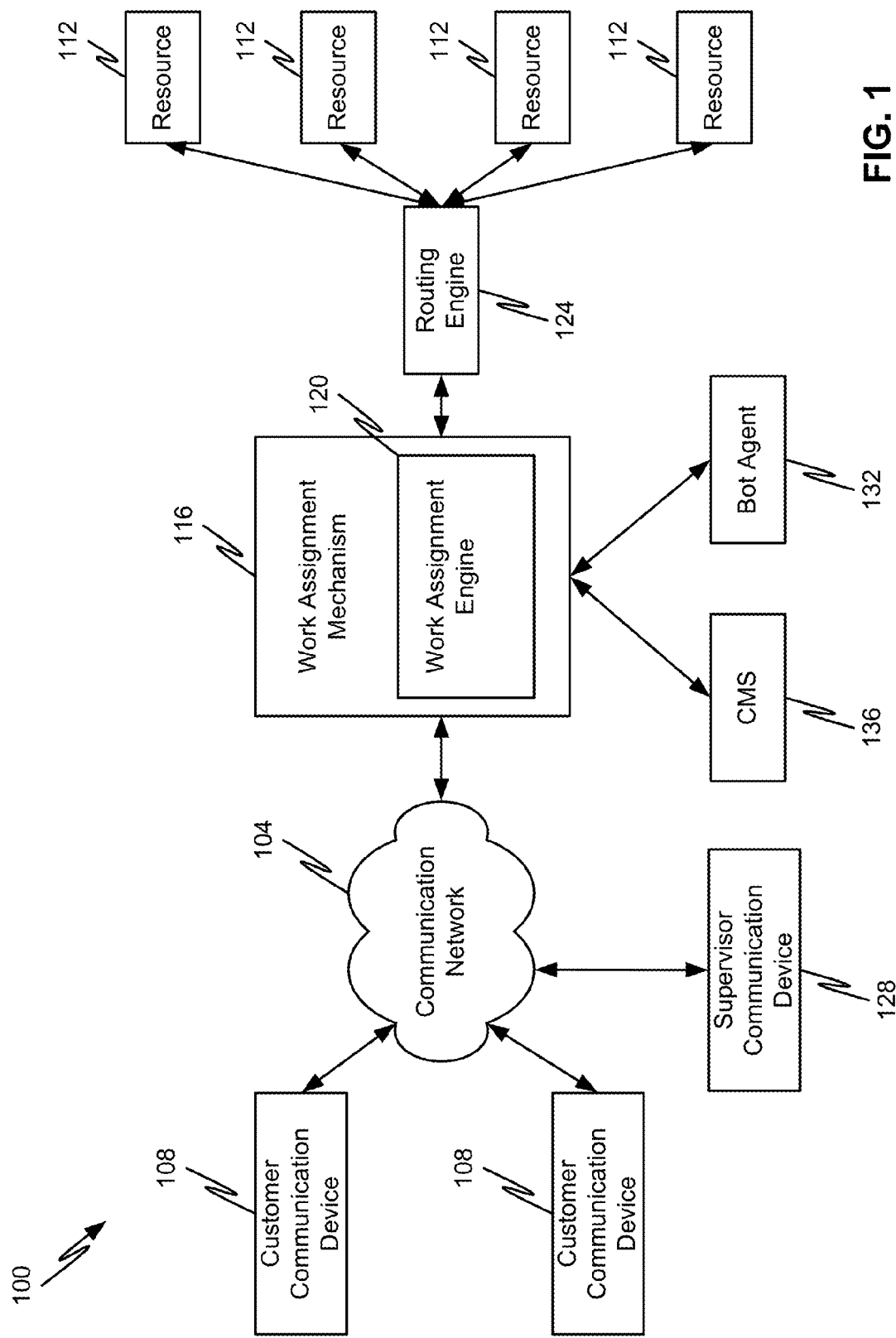
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, each of which are hereby incorporated herein by reference in their entirety.

The supervisor communication device 128 may correspond to a communication device or collection of devices operated and/or controlled by a contact center supervisor or manager. In accordance with at least some embodiments of the present disclosure, a supervisor may utilize the communication device 128 to evaluate or help the servicing of a work item by a resource 112. The supervisor may utilize the communication device 128 to initiate or respond to interaction regarding work items with the work assignment mechanism 116, a bot agent module 132, elements within or outside of the communication network 104, and to processing resources 112. In some embodiments, the supervisor communication device 128 may correspond to a resource 112 and/or be connected within a contact center rather than being connected to a contact center via the communication network 104.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the customer communication devices 108 and the supervisor communication device(s) 128 may comprise any type of known communication equipment or collection of communication equipment. Examples of a suitable communication device 108, 128 include, but are not limited to, a personal computer, laptop, tablet, cellular phone, smartphone, telephone, or combinations thereof. In general, each communication device 108, 128 may be adapted to support video, audio, text, and/or data communications with other communication devices 108, 128 as well as the processing resources 112. The type of medium used by the communication device 108, 128 to communicate with other communication devices 108, 128 or processing resources 112 may depend upon the communication applications available on the communication device 108, 128.

In accordance with at least some embodiments of the present disclosure, the work item is sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112a-n connected to the work assignment mechanism 116.

In some embodiments, the work assignment mechanism 116 comprises a work assignment engine 120 which enables the work assignment mechanism 116 to make intelligent routing decisions for work items and/or bot agents 132. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment mechanism 116 can communicate with the bot agent module 132 which may provide contact center manager assistance, including Service Observing (SO), active call matching, scanning, and other features. The work assignment mechanism 116 can communicate with a Call Management System (CMS) 136 which may provide integrated analysis and reporting on the performance of one agent, a group of agents, a single contact center site, or multiple contact center sites. The bot agent module 132 may additionally integrate CMS 136 data and application data for display and use on a user interface of the communication device 128. Applications may work in conjunction with the bot agent module 132, providing both native functionality and third-party functionality provided by an Application Programming Interface (API).

Figure 2:
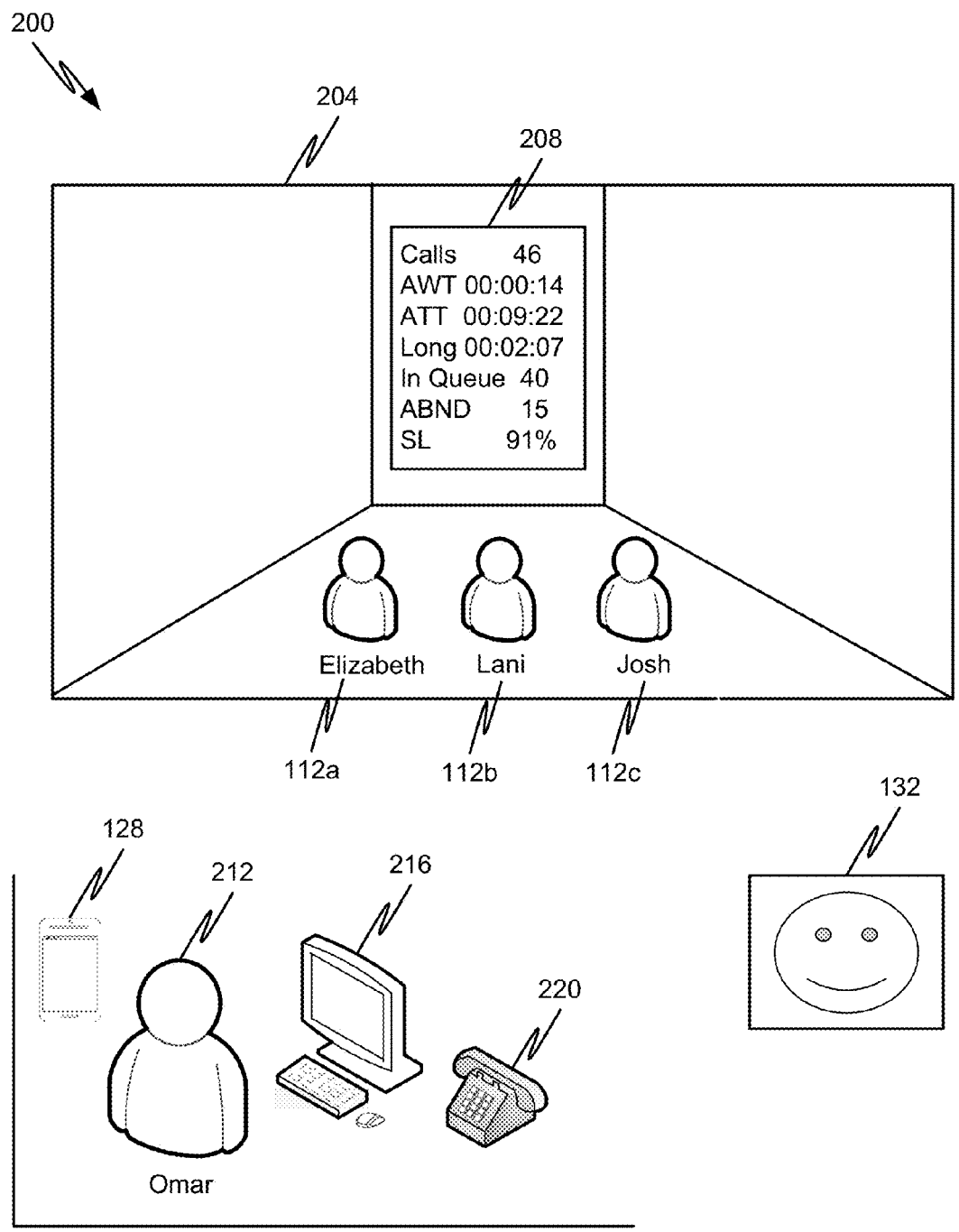
FIG. 2 is an example of a contact center floor in accordance with embodiments of the present disclosure.

FIG. 2 depicts another view of a contact center 200 in accordance with embodiments of the present disclosure. The phrase "contact center" as used herein refers to a company that manages client correspondence through a variety of mediums, including telephone, fax, email, mail, chat, text, etc. A contact center "floor" 204 typically contains resources 112, one or more supervisors 212, and one or more displays 208 (e.g., wall-mounted Light Emitting Diode (LED) displays).

The contact center floor 204 can contain one or more large, wall-mounted displays, commonly referred to as wallboards 208, operable to integrate with data sources. The wallboard 208 may display many types of information, including but not limited to, RSS feed data, statistics (e.g., Key Performance Indicators—KPIs), metrics, graphs, images, announcements, alerts, thresholds, and messages. The contact center 200 can include more or fewer elements, and elements of the contact center 200 can be arranged differently and interact differently than those shown in FIG. 2.

Contact center resources 112 may be agents at workstations and may be seated with a view of one or more wallboards 208. For example, Elizabeth 112a, Lani 112b, and Josh 112c may be resources 112 for the contact center 200, operable to receive and complete work items. Generally, the agent 112 can have a workstation that includes a telephone, a computer, a smart device, and other communication devices inside the facility or remote from the contact center floor 204. As can be appreciated, the contact center floor 204 and the agent 112 workstations may comprise more or fewer of the elements listed. One or more supervisors 212 may be available to monitor activities on the contact center floor 204 and to assist, restrain, and train agents 112. Omar 212, for example, may have a workstation inside the facility or remote from the contact center floor 204. The supervisor workstation may include a land-line telephone 220, a computer 216, a smart device 128, or other communication devices.

In one embodiment, the supervisor 212 may have a communication device 128. One non-limiting example of the device 128 is a mobile or cordless device that is connected to other contact center components via wireless connections (e.g., 802.11N/3G/4G/etc., and capable of browsing, telephony, and/or location. The device 128 may be a telephone or a tablet. More specifically, the supervisor communication device 128 may be a telephone or tablet, operable to run applications related to the supervision of the contact center floor 204. The supervisor communication device 128 may be operable to receive calls, short message service (SMS) texts, pop-ups, and data and operable to communicate with a bot agent module 132 and other elements.

Figure 3:
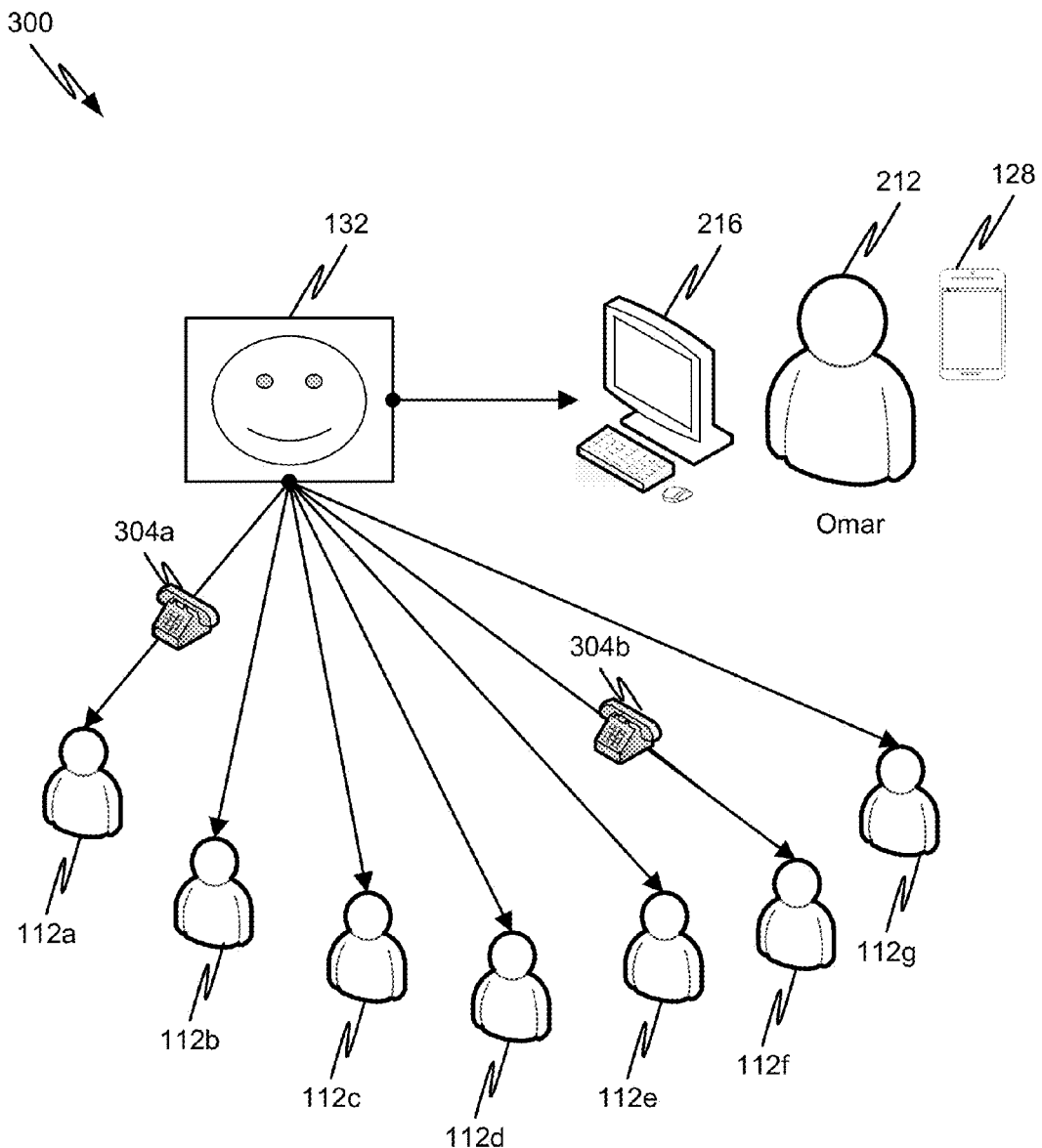
FIG. 3 depicts a bot agent interaction with a user interface in accordance with embodiments of the present disclosure.

FIG. 3 depicts a bot agent interaction with a supervisor workstation 300 in accordance with embodiments of the present disclosure. One or more bot agents, operable through the bot agent module 132, are operable to monitor, receive, alert, transfer, pull, push, and aggregate data and calls from multiple sources to a supervisor workstation 216 and/or the supervisor communication device 128. The bot agent 132 may monitor and/or join calls in progress 304. The bot agent 132 may also monitor statistics, metrics, goals, and other administrable values. The bot agent module may provide the information to the supervisor workstation, and the data may be presented at a user interface, including at a computer 216, and/or on a smart communication device 128, a wallboard 208, or any other device capable of presenting the display.

As a non-limiting example, Omar 212, the supervisor, may be in charge of a group of agents 112a-g, responsible for new sales and service calls for a satellite broadcasting service. Omar 212 also takes calls, emails, and instant messages as an individual contributor to the team, so Omar 212 finds it difficult to actively monitor all of the agents 112a-g all of the time. The administrator of the communication system 100 has installed a new bot agent module 132 that Omar 212 is really excited to try. The bot agent 132 is configured to assist Omar 212 in actively monitoring the activities of the agents 112a-g. Omar 212 and the administrator set goals, thresholds, metrics and other particulars of the contact center to display on his supervisor workstation computer 216 and smartphone 128. Once invoked, the bot agent 132 may be configured to work immediately, looking for issues, anomalies, problems, opportunities, etc. based on programming specifically requested by Omar 212.

The bot agent 132 receives an alert from the communication system 100 that an agent 112a on a call 304a, has been on a service call over the five minute threshold set by the administrator for Omar 212. The bot agent 132 automatically joins the call based on the alert to begin an analysis. One purpose of the analysis is to determine whether or not the agent 112a needs help. The customer on the call 304a with the agent 112a is screaming and using profanity. The communication system 100 is operable to detect, via voice analytics, that the customer has become unacceptably hostile. The bot agent 132 determines that it would be helpful to have the supervisor, Omar 212, join the call. The bot agent 132 marks the call and sends an alert to Omar 212. The supervisor Omar 212 gets a pop-up alert letting him know that agent 112a needs help. Omar 212 pushes a button on his display, requesting that the bot agent 132 connect Omar 212 to the call 304a. Omar 212 has had special training to deal with particularly nasty customers, and Omar 212 doesn't appreciate the customer attacking one of his agents 112a. Omar 212 sends an instant message to the agent 112a letting the agent know that he is joining. The agent 112a acquiesces and Omar 212 joins the call. Omar 212 uses his training to calm the customer down. Once the issues are resolved, Omar 212, the agent 112a, and the bot agent 132 leave the call.

Meanwhile, the bot agent 132 gets an alert from agent 112f on call 304b. The agent 112f asks for assistance, and the bot agent 132 responds. The agent 112f asks for an inventory check and a shipping estimate for three products while entering programming information for the customer. The bot agent 132 is operable to help find this information and doesn't need to get Omar 212 involved. The bot agent 132 queries for this information and returns the quantities and dates to the agent 112f. The agent 112f gives the information to the customer on call 304b. Once the order is complete, the bot agent 132 and the agent 112f terminate the call. While the bot agent 132 was helping the agent 112f, Omar 212 was able to run reports and email them off to his boss, Ivan. Efficiencies are maintained, and the agents 112a-g, Omar 212, and Ivan are happy.

Figure 4:
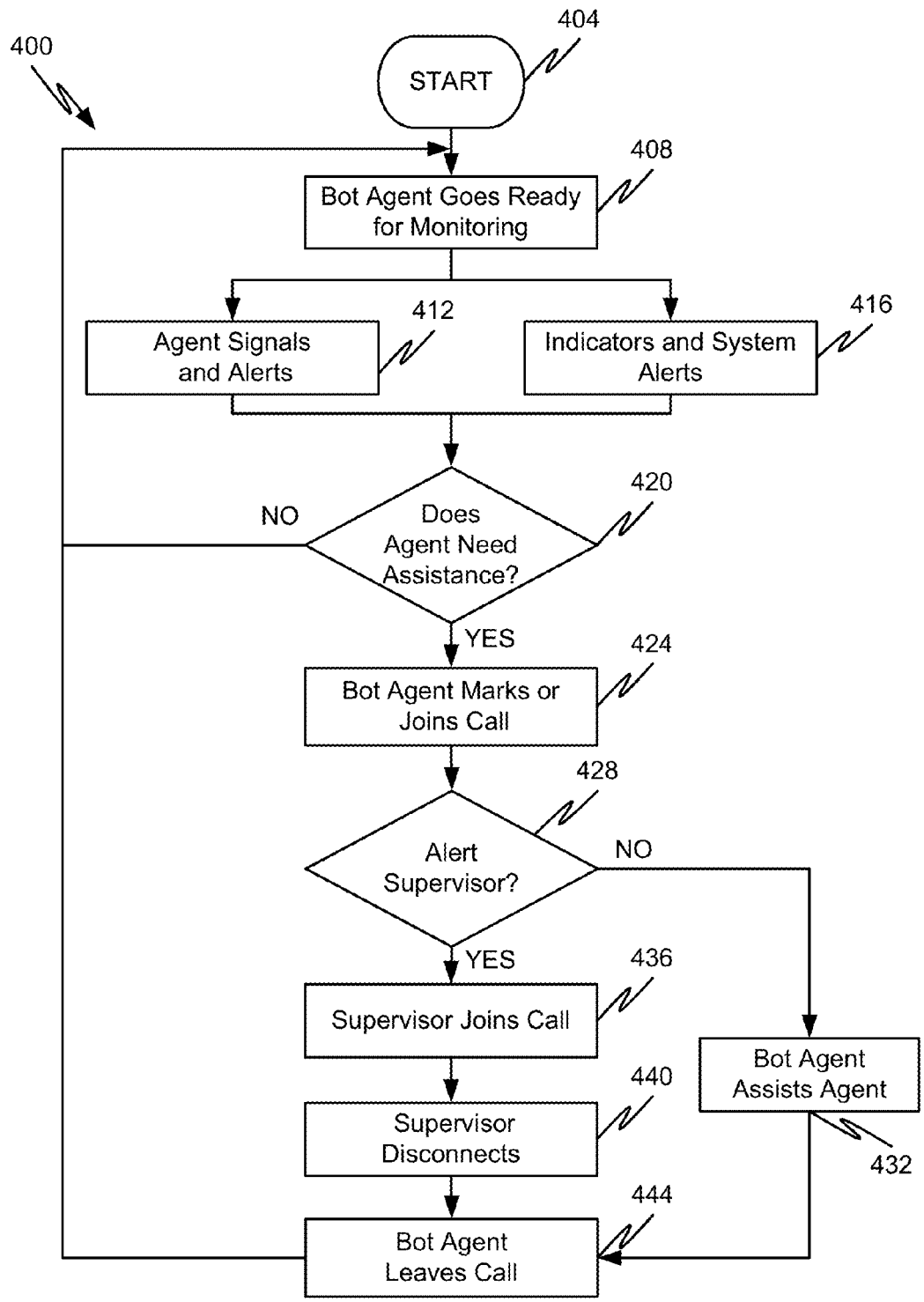
FIG. 4 depicts a flow diagram for a method for bot agent assistance in accordance with embodiments of the present disclosure.

The method 400 for bot agent assistance in accordance with embodiments of the present disclosure is shown in FIG. 4. Generally, the method 400 begins with a start operation 404 and runs as a continuous loop. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to the systems, components, modules, software, data structures, etc. described in conjunction with FIGS. 1-3.

The method 400 begins at step 404 and continues when a contact center agent, human or bot, logs in, the agent becomes available to process work items (step 408). When the contact center agent, human 112 or bot 132, has completed processing a work item, the agent 112, 132 will once again be ready to have a new work item assigned thereto. This change of availability is known as going ready. Typically, a bot agent 132 at step 408 can go ready and initiate a monitoring process. The bot agent 132 may go ready without being associated with a terminal. The phantom bot agent 132 may live in the matching portion of the work assignment engine 120, scanning work. When matching, the bot agent 132 is operable to conference in agents 112 and supervisors 212.

The bot agent 132 may also monitor statistics to see how well agents 112 are handling work items that are being monitored. Statistics might include, but are not limited to, Average Call Handle Time (ACHT) which may include total talk time and wrap time divided by the total number of calls, Service Level (SL %) which may indicate the percentage of calls answered within a certain amount of time (e.g., 30 seconds), Abandon Rate (ABN %) which may be the number of dropped calls divided by total incoming calls, Average Speed Answer (ASA) which may be the average number of seconds or minutes it takes to answer a call, Longest Wait Time (LWT) and Average Wait Time (AWT) for incoming calls, and Calls in Queue (CIQ) which may indicate how many calls are pending, waiting for agent 112 handling. The bot agent 132 may additionally monitor data from speech analytics and contextual programs to determine how well agents 112 are handling work items. A definition of a low-performing agent 112 can be customized using the work assignment engine 120. Customized strategies are not required to match strategies for incoming customer calls. The customized strategy may be used internally for the supervisor 212 to find low-performing agents 112. Examples of a custom low peak performing agent strategy might compare metrics like recent handling duration times versus best handling duration times and revenue/handling times versus best revenue/handling times. Matching and comparison may be automated with a bot agent 132 call.

In addition to active monitoring of available data, the bot agent 132 may be available on demand from the agent 112. In step 412, the agent 112 may send an alert and/or signal of some kind to the bot agent 132, requesting assistance. The request may be in a form including, but not limited to, a call, a sequence of tones, an email, a text, a button push on a user interface, etc.

In step 416, a communication system 100 may send an indicator and/or an alert to the bot agent 132 when certain performance indicators (e.g., KPIs) exceed a threshold or expected value. Based on predetermined matching and comparison values, the bot agent 132 may begin an evaluation as to whether or not the agent 112 needs assistance. If the agent 112 does not need assistance, the process may begin again with the bot agent 132 returning to a ready state (step 408). In step 420, the bot agent 132 may make a determination that the agent 112 needs assistance. If the answer to the query is yes, the bot agent 132 may mark and/or join the call in step 424 to further evaluate the assistance needed. The supervisor 212 may be alerted by the bot agent 132 and/or the work assignment engine 120, in step 428. If the supervisor 212 does not need to join the call, the bot agent may automatically assist the agent 112 without requiring manual input, in step 432. In response to the need to join the call, the supervisor 212 may check data from the communication system 100, including a work item ticket, thresholds, statistics, metrics, and/or see the agent's 112 desktop using native and/or third-party applications. If the supervisor 212 feels that action is warranted, the supervisor 212 may join the call and/or initiate additional service observing features, in step 436.

For example, if Josh 112c has been on a call for ten minutes over the threshold, Omar 212 may join the call and listen in. If Omar 212 has additional concerns, he may initiate recording, an IM session with Josh 112c, and pull up the customer's account information and history. Once Omar 212 disconnects in step 440 and the bot agent 132 leaves the call, in step 444, the process may loop back to the beginning, and the monitoring bot agent 132 may go ready, in step 408.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method of facilitating supervisor review of contact center operations, the method comprising:
configuring a bot agent with a matching criteria that enables the bot agent to be matched with at least one of an agent or a work item within a contact center;
scanning, with a work assignment engine, at least one of a work pool or an agent pool of a contact center to determine attributes for at least one of a work item or an agent within the contact center;
selecting, with the work assignment engine, at least one of a work item or an agent that comprises a set of attributes satisfying the matching criteria;
assigning the bot agent to the selected at least one of a work item or an agent such that the bot agent is enabled to interact with the selected at least one of a work item or an agent;
determining that an agent requires assistance with a call;
assigning the bot agent to the call;
enabling the bot agent to assist the agent with the call;
receiving an agent performance threshold and including the agent performance threshold in the matching criteria;
determining that a performance metric of the agent violates the agent performance threshold; and
in response to determining that the performance metric of the agent violates the agent performance threshold, selecting the agent for assignment to the bot agent.

2. The method of claim 1, wherein the bot agent assists the agent without receiving human input from a contact center supervisor.

3. The method of claim 1, further comprising:
determining that the bot agent has completed processing the selected at least one of a work item or an agent; and
in response to determining step, automatically changing an availability of the bot agent to AVAILABLE thereby enabling the bot agent to be assigned to a new at least one of a work item or an agent.

4. The method of claim 1, wherein the at least one of a work item or an agent corresponds to a work item, the method further comprising:
determining a performance threshold and including the performance threshold in the matching criteria;
determining that the work item belongs to a group of work items whose attributes are in violation of the performance threshold; and
in response to determining that the work item belongs to the group of work items whose attributes are in violation of the performance threshold, selecting the work item for assignment to the bot agent.

5. The method of claim 4, wherein the performance threshold is selected by a contact center supervisor.

6. The method of claim 5, wherein the contact center supervisor is connected to the work item by joining the contact center supervisor with a call established between the bot agent and the work item.

7. A communication system, comprising:
a bot agent module facilitating supervisor review of contact center operations, and performing the following operations:
configure a bot agent with a matching criteria that enables the bot agent to be matched with at least one of an agent or a work item within a contact center;
scan with a work assignment engine, at least one of a work pool or an agent pool of a contact center to determine attributes for at least one of a work item or an agent within the contact center;
select with the work assignment engine, at least one of a work item or an agent that comprises a set of attributes satisfying the matching criteria;
assign the bot agent to the selected at least one of a work item or an agent such that the bot agent is enabled to interact with the selected at least one of a work item or an agent;
determine that an agent requires assistance with a call;
assign the bot agent to the call;
enable the bot agent to assist the agent with the call;
receive an agent performance threshold and including the agent performance threshold in the matching criteria;
determine that a performance metric of the agent violates the agent performance threshold; and
in response to determining that the performance metric of the agent violates the agent performance threshold, select the agent for assignment to the bot agent.

8. The system of claim 7, further comprising:
a bot agent module configured to perform the following operations:
determine that the bot agent has completed processing the selected at least one of a work item or an agent;
in response to determining step, automatically change an availability of the bot agent to AVAILABLE thereby enabling the bot agent to be assigned to a new at least one of a work item or an agent;
determine a performance threshold and including the performance threshold in the matching criteria;
determine that the work item belongs to a group of work items whose attributes are in violation of the performance threshold; and
in response to determining that the work item belongs to the group of work items whose attributes are in violation of the performance threshold, select the work item for assignment to the bot agent.

9. The method of claim 4, further comprising:
determining properties associated with the work item and the agent;
in response to determining a set of properties associated with the work item and the agent, change at least a portion of the set of properties associated with the work item and the agent, wherein the change triggers a match scan based at least in part on the change.

10. A communication system, comprising:
a bot agent module facilitating supervisor review of contact center operations, and performing the following operations:
configure a bot agent with a matching criteria that enables the bot agent to be matched with at least one of an agent or a work item within a contact center;
scan with a work assignment engine, at least one of a work pool or an agent pool of a contact center to determine attributes for at least one of a work item or an agent within the contact center;
select with the work assignment engine, at least one of a work item or an agent that comprises a set of attributes satisfying the matching criteria;
assign the bot agent to the selected at least one of a work item or an agent such that the bot agent is enabled to interact with the selected at least one of a work item or an agent;
determine that an agent requires assistance with a call;
assign the bot agent to the call;
enable the bot agent to assist the agent with the call;
determine a set of properties associated with the work item and the agent; and
in response to determining a set of properties associated with the work item and the agent, instructions to change at least a portion of the set of properties associated with the work item and the agent, wherein the change triggers a match scan based at least in part on the change.

11. The system of claim 10, wherein the bot agent assists the agent without receiving human input from a contact center supervisor.

12. The system of claim 10, further comprising:
a bot agent module configured to perform the following operations:
determine that the bot agent has completed processing the selected at least one of a work item or an agent; and
in response to determining step, automatically changing an availability of the bot agent to AVAILABLE thereby enabling the bot agent to be assigned to a new at least one of a work item or an agent.

13. The system of claim 10, wherein the at least one of a work item or an agent corresponds to a work item, the system further comprising:
a bot agent module configured to perform the following operations:
determine a performance threshold and including the performance threshold in the matching criteria;
determine that the work item belongs to a group of work items whose attributes are in violation of the performance threshold; and
in response to determining that the work item belongs to the group of work items whose attributes are in violation of the performance threshold, selecting the work item for assignment to the bot agent.

14. The system of claim 13, wherein the performance threshold is selected by a contact center supervisor.

15. The system of claim 14, wherein the contact center supervisor is connected to the work item by joining the contact center supervisor with a call established between the bot agent and the work item.

* * * * *